United States Patent [19]

Koch et al.

[11] Patent Number: 4,916,045
[45] Date of Patent: Apr. 10, 1990

[54] PHOTOSENSITIVE RECORDING ELEMENT CONTAINING AN IONIC POLYMER

[75] Inventors: Horst Koch, Grosskarlbach; Wolfgang F. Mueller; Reiner Hofmann, both of Neustadt; Peter Richter, Frankenthal, all of Fed. Rep. of Germany

[73] Assignee: BASF Aktiengesellschaft, Ludwigshafen, Fed. Rep. of Germany

[21] Appl. No.: 330,964

[22] Filed: Mar. 30, 1989

Related U.S. Application Data

[63] Continuation of Ser. No. 133,333, Dec. 15, 1987, abandoned, which is a continuation-in-part of Ser. No. 940,647, Dec. 11, 1986, abandoned.

[30] Foreign Application Priority Data

Dec. 11, 1985 [DE] Fed. Rep. of Germany ....... 3543646

[51] Int. Cl.$^4$ ................................................. G03C 1/76
[52] U.S. Cl. ..................................... 430/270; 430/271; 430/281; 430/286; 430/287; 430/905; 522/8; 522/121; 522/149; 522/185
[58] Field of Search ............... 430/270, 271, 281, 286, 430/287, 905; 522/8, 121, 149, 185

[56] References Cited

U.S. PATENT DOCUMENTS 3,974,129 8/1976 Delamare ........................... 252/149
4,524,090 9/1985 Lewis ................................... 430/296

FOREIGN PATENT DOCUMENTS 0118401 9/1981 Japan .................................... 525/285

Primary Examiner—Jack P. Brammer
Attorney, Agent, or Firm—Keil & Weinkauf

[57] ABSTRACT

The invention provides a novel photosensitive recording material in the shape of a multilayer element comprising
(i) a photopolymerizable or photocrosslinkable relief-forming layer (RL) of a thickness from 0.1 to 6000 μm and
(ii) a dimensionally stable support layer.

The said relief-forming layer (RL) consists essentially of an ionic polymer, of one or more photoinitiators and, if desired, of one or more photopolymerizable monomers.

The said ionic polymer contains
(A) from about 45 to 90% by weight, based on the ionic polymer, of a polymer main chain formed from an alkadiene polymer A',
(B) from about 6 to about 45% by weight, based on the ionic polymer, of one or mored olefinically unsaturated side radicals having the structure (I),

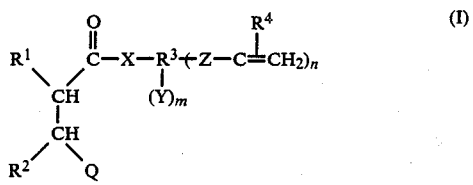

where
$R^1$ and $R^2$ are different and are each H or a carbon atom of A',
$R^3$ is a polyvalent, straight-chain or branched $C_1$–$C_{20}$-alkylene radical whose chain or branches may be interrupted by —O—, —N— or —S—,
X is —O—, —S— or —NH—,
Y is a polar group,
Z is —CH$_2$—, —O—,

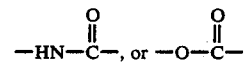

$R^4$ is H or CH$_3$,
Q is —COOH or —COO$^\ominus$,
m is an integer from 1 to 3, and
(C) from about 0.5 to about 10% by weight, based on the ionic polymer, of cations selected from the group consisting of cations of elements of the main groups I to V, of the subgroups I to VIII and of the lanthanide series of the periodic table of elements, of ammonia, of polyfunctional organic amines, and of hydrazine.

In addition, the said ionic polymer may contain further side radicals D which are not photopolymerizable.

The novel photosensitive recording material is highly suited for the production of printing plates, relief plates and photoresists.

4 Claims, No Drawings

PHOTOSENSITIVE RECORDING ELEMENT CONTAINING AN IONIC POLYMER

This application is a continuation of application Ser. No. 133,333, filed on Dec. 15, 1987, which is a continuation-in-part of application Ser. No. 940,647, filed on Dec. 11, 1986, now abandoned The present invention relates to a novel photosensitive recording material in the shape of a multilayer element comprising
(i) a photopolymerizable or photocrosslinkable relief-forming layer (RL) of a thickness from 0.1 to 6000 μm and
(ii) a dimensionally stable support layer.

The present invention furthermore relates to the use of such photosensitive recording materials for the preparation of printing plates, relief plates and photoresists.

Ionic polymers are disclosed in US-A-3,016,297. The said patent describes β-ketomonocarboxylates of polyesters based on polyols. These polyesters carry chelating side groups. When polyvalent metal cations are added, the said polyesters are crosslinked with the aid of the said side groups. These polyesters may also contain vinylidene side groups

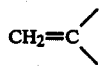

and may possess vinylene groups

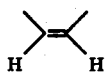

in the polymer main chain. However, photosensitive recording materials based on such polyesters can only be developed with mixtures of (a) liquid chelating solvents and conventional organic solvents, and (b) conventional organic solvents and very strong acids, and they must contain photopolymerizable compounds (monomers). Both give rise to a large number of process engineering and disposal problems which are no longer acceptable today.

JP-A-75/073 944 and JP-A-76/144 445 disclose photosensitive recording materials which contain in their photopolymerizable or photocrosslinkable relief-forming layer (RL) nonionic polymers formed from a maleated polybutadiene partially esterified with glycidyl (meth)acrylate or with an ω-hydroxyalkyl (meth)acrylate, photopolymerizable compounds (monomers) and photoinitiators. However, they are pasty and tacky or even liquid, and the photopolymerizable compounds (monomers) used therein present handling and disposal problems owing to their toxicity.

JP-A-81/118401 describes the preparation of a resin comprising the following steps:
(1) reacting a polyisoprene or a polybutadiene with maleic acid anhydride to yield an addition product having a visocity average molecular weight of 800 to 80,000,
(2) reacting the said addition product with a functional unsaturated compound having hydroxyl, epoxy and/or amino groups to form a modified maleic diene polymer is esterified and/or amide form.
(3) polymerizing the said modified maleic diene polymer is solution and
(4) neutralizing the resin thus obtained.

The said resin can be used as a paint film. It cannot be used for the production of photocrosslinkable or photopolymerizable relief-forming layers (RL) of photosensitive recording materials, because it has already been polymerized during step 3 of its preparation.

It is an object of the present invention to provide novel photosensitive recording materials in the shape of multilayer elements which do not have the drawbacks of the known photosensitive recording materials. It is a further object of the present invention to provide novel, monomer-containing or monomer-free photosensitive recording materials which are dimensionally stable and nontacky and, after they have been subjected to imagewise exposure, can be developed with liquid basic media, in particular aqueous alkaline media. It is a further object of the present invention to provide novel abrasion-resistant, dimensionally stable, solvent-stable printing plates and relief plates and etchant-stable photoresists.

We have found that these objects are achieved by a photosensitive recording material in the shape of a multilayer element comprising
(i) a photopolymerizable or photocrosslinkable relief-forming layer (RL) of a thickness from 0.1 to 6000 μm consisting essentially of
(i1) an ionic polymer which contains
(A) from about 45 to about 90% by weight, based on the ionic polymer, of a polymer main chain formed from an alkadiene polymer A' having a number average molecular weight $M_n$ of from 500 to 20,000.
(B) from about 6 to about 45% by weight, based on the ionic polymer, of one or more olefinically unsaturated side radicals which are introduced into the alkadiene polymer A' by, first maleation of the alkadiene polymer A' yielding succinic acid anhydride side groups therein, and, second, partial esterification or partial amidation of the said succinic acid anhydride side groups with suitable compounds, the said side radicals B having the structure (I)

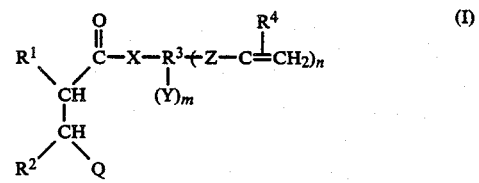

where $R^1$ and $R^2$ differ from one another and are each hydrogen or a carbon atom of the alkadiene chain A', $R^3$ is selected from the group consisting of polyvalent, straight-chain aliphatic hydrocarbon radicals of 1 to 20 carbon atoms, polyvalent branched aliphatic hydrocarbon radicals of 1 to 20 carbon atoms, polyvalent, straight-chain aliphatic hydrocarbon radicals of 1 to 20 carbon atoms, whose chains are interrupted by oxygen, nitrogen or sulfur, and polyvalent, branched aliphatic hydrocarbon radicals of 1 to 20 carbon atoms whose chains or branches are interrupted by oxygen, nitrogen or sulfur;

X is oxygen, sulfur or amino, Y is a polar group, m is 0 or an integer from 1 to 5, n is an integer from 1 to 3, Z is a methylene, ether, amide or ester group, $R^4$ is hydrogen or methyl, and Q is carboxyl or carboxylate, and (C) from about 0.5 to about 10% by weight, based on the ionic polymer, of cations selected from the group consisting of cations of elements of the main groups I to V, of the subgroups I to VIII and of the lanthanide series of the periodic table of elements, of ammonia, of polyfunctional organic amines, and of hydrazine, (i2) from 0.001 to 10 parts by weight, per 100 parts by weight of the ionic polymer of one or more photoinitiators, and (i3) from 0 to 30 parts by weight per 100 parts by weight of the ionic polymer of photopolymerizable, nongaseous monomers which are compatible with the ionic polymer, and (ii) a dimensionally stable support layer.

In an advantageous embodiment, the novel photosensitive recording materials contain in their relief-forming layer (RL) the ionic polymer consisting of from about 45 to about 90% by weight, based on the ionic polymer, of the said polymer main chain A formed by the said alkadiene polymer A'; from about 6 to about 25% by weight, based on the ionic polymer, of one or more of the said olefinically unsaturated side radicals B, from about 0.5 to about 10% by weight, based on the ionic polymer, of one or more of the said cations C, and from about 3 to about 20% by weight, based on the ionic polymer, of one or more radicals which are introduced into A' by, first, maleation, yielding succinic acid anhydride side groups, and, second, partial esterification or partial amidation of the said succinic acid anhydride side groups, the said radicals D having the structure (II),

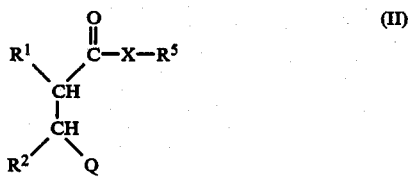

where $R^1$, $R^2$, Q and X have the aforementioned meaning and $R^5$ is a radical selected from the group consisting of polyvalent, straight-chain and branched aliphatic hydrocarbon radicals of 1 to 25 carbon atoms which contain one or more polar groups, of polyvalent straight-chain and branched aliphatic hydrocarbon radicals of 1 to 25 carbon atoms which contain one or more polar groups and whose chains and branches are interrupted by oxygen, nitrogen or sulfer; of ω-hydroxy-poly(alkylene oxide)-α-yl radicals and of ω-alkyl-poly(alkylene oxide)-α-yl radicals.

Ionic polymers preferably used consist of from 50 to 80, in particular from 55 to 70, % by weight of A, from 19.3 to 42, in particular from 29 to 41, % by weight of B and from 0.7 to 8, in particular from 1 to 4, % by weight of C, the percentages being based on the weight of the ionic polymer.

The periodic table of elements is understood as being the system envolved by Mendeleev and Meyer, as reproduced, for example, in the textbook entitled Anorganische Chemie by F. A. Cotton and G. Wilkinson, Verlag Chemie, Weinheim, 1967.

The term "polar groups" is understood as meaning molecular radicals which are capable of dipole-dipole, dipole-ion or ion-ion interactions.

For the purposes of the present invention, the term "liquid medium" denotes solvents, mixtures of solvents or solvents and their mixtures which contain organic and/or inorganic additives.

Thus, the term "liquid basic medium" denotes solvents, mixtures of solvents or solvents or solvent mixtures which contain organic and/or inorganic additives and which themselves are electron donors or contain compounds which are electron donors or contain compounds which donate hydroxyl ions.

The novel photosensitive recording materials are solid, elastomeric and non-tacky. After their imagewise irradiation with actinic light they have excellent developability in liquid basic media, in particular aqueous basic media. A particularly surprising advantage is that the concomitant use of photopolymerizable monomers in their photopolymerizable or photocrosslinkable relief-forming layer (RL) can be dispensed with. The novel dimensionally stable, non-tacky photosensitive recording materials which may or may not contain monomers, are yielding abrasion-resistant printing plates, relief plates and photoresists. Because of the very good compatibility of their components the relief-forming layers (RL) of the novel photosensitive recording materials are transparent and without turbidity. They therefore possess excellent exposure properties and permit faithful reproduction of even very fine image elements. Because of the very large difference in solubility between the exposed and unexposed areas of even the monomer-free relief-forming layers (RL) of the novel photosensitive recording materials, the washout conditions can readily be made more severe so that particularly well formed reliefs can be produced. Furthermore, in the absence of monomers, the toxicological and application problems usually encountered with monomers no longer occur.

The printing plates prepared from the novel photosensitive recording materials are so flexible and resilient that they can be clamped repeatedly on small-diameter printing cylinders. Furthermore, they exhibit virtually no swelling under the action of aqueous printing inks and are dimensionally stable and abrasion resistant. Thus, even in the case of long print runs, excellent prints are obtained.

Suitable alkadiene polymers A' from which the main chain A of the ionic polymers is formed, possess a number average molecular weight $M_n$ of from 500 to 20,000 (determined by gel permeation chromatography in toluene). Those having a molecular weight $M_n$ of from 500 to 10,000 are advantageous and are generally referred to as oligomers. Suitable substances are oligobutadiene, oligoisoprene, oligocyclopentadiene, butadiene/isoprene cooligomers, random butadiene/styrene cooligomers; random isoprene/styrene cooligomers, random butadiene/acrylonitrile cooligomers, random butadiene/(meth)acrylate cooligomers, random isoprene/(meth)acrylate cooligomers, random butadiene/maleic anhydride cooligomers, random butadiene/styrene/(meth)acrylate teroligomers, random butadiene/styrene/cyclopentadiene teroligomers, two-block styrene/butadiene cooligomers, two-block styrene/isoprene cooligomers, three-block styrene/butadiene/styrene cooligomers and three-block styrene/isoprene/styrene cooligomers.

Some of the olefinic double bonds present in the oligomers may be hydrogenated, halogenated, hydrohalogenated or reacted with mercapto compounds.

Butadiene oligomers are particularly advantageous. Suitable radicals $R^3$ are polyvalent, straight-chain or branched aliphatic hydrocarbon radicals of 1 to 20 carbon atoms whose chain or branches may be interrupted by oxygen, nitrogen or sulfur, for example methylidene, -$CH_2$-,
ethylene, -$CH_2$-$CH_2$-,
trimethylene, -$CH_2$-$CH_2$-$CH_2$-,
propane-1,2-diyl,

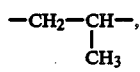

tetramethylene, -$CH_2$-$CH_2$-$CH_2$-$CH_2$-,
2,2-dimethylpropane-1,3-diyl,

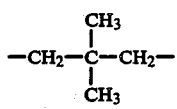

neopentanetetrayl,

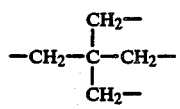

propane-1,2,3-triyl,

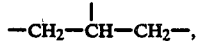

3-thiapentane-1,5-diyl, -$CH_2$-$CH_2$-S-$CH_2$-$CH_2$-,
3-azapentane-1,5-diyl, -$CH_2CH_2$-NH-$CH_2$-$CH_2$-,
oligo(ethylene oxide)-$\alpha,\omega$-diyl, ($CH_2CH_2O$)p$CH_2CH_2$-, where p is from 1 to 10, or
4-oxaheptane-1,2,6,7-tetrayl

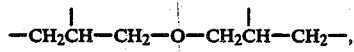

of which the ethylene, tetramethylene and propane-1,2,3-triyl radicals are preferred.

Examples of suitable polar groups Y are hydroxyl, amino, thiolo, carboxylic acid, phosphonic acid and sulfonic acid groups, of which the hydroxyl group is preferred.

It is advantageous if X is oxygen and Z is an ether or ester group.

Suitable radicals $R^5$ are polyvalent, straight-chain or branched aliphatic hydrocarbon radicals of 1 to 25 carbon atoms which contain one or more polar groups and whose chains or branches may be interrupted by oxygen, nitrogen or sulfur, $\omega$-hydroxypoly-(alkylene oxide)-$\alpha$-yl or $\omega$-alkylpoly-(alkylene oxide)-$\alpha$-yl radicals, e.g. 2-hydroxyeth-1-yl, 2-amino-eth-1-yl, 2-thioloeth-1-yl, 2,3-dihydroxyprop-1-yl, 2,6,7-trihydroxy-4-oxahept-1-yl, 2-sulfoeth-1-yl, 2-phosphoeth-1-yl, 2-carboxyeth-1yl, $\omega$-hydroxypoly-(ethylene oxide)-$\alpha$-yl or $\omega$-methylpoly-(ethylene oxide)-$\alpha$-yl.

Examples of particularly advantageous radicals B introduced into A' are

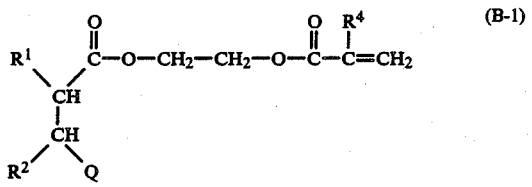

(B-1)

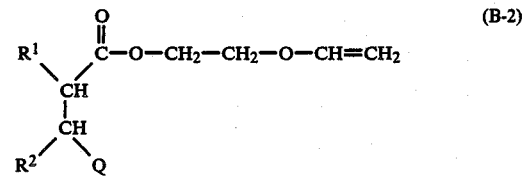

(B-2)

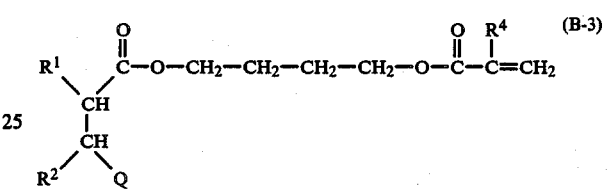

(B-3)

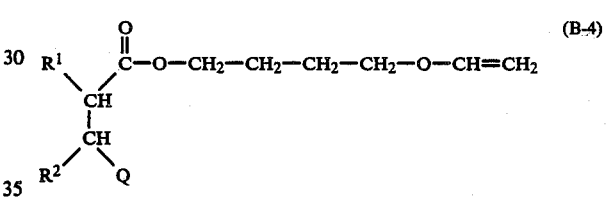

(B-4)

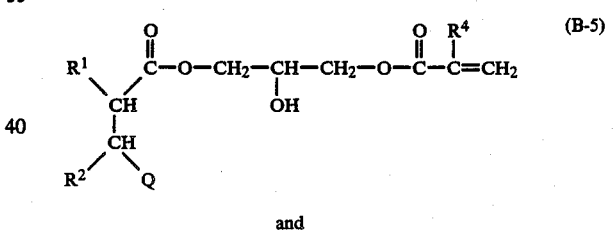

(B-5)

and

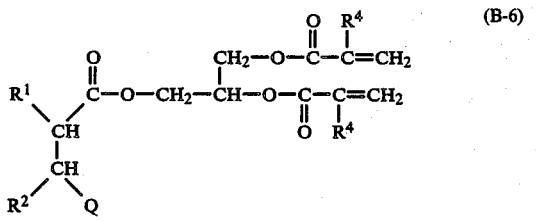

(B-6)

of which the radicals B-1 and B-5, where $R^4$ is methyl, and B-4 are preferred.

Suitable cations C are cations of elements of main groups I to V, of subgroups I to VIII and of the lanthanide series of the periodic table of elements, and cations of ammonia, of polyfunctional organic amines and/or of hydrazine, for example cations of Li, Mg, Ca, Sr, Ba, Al, Ga, In, Ge, Sn, Pb, Sb, Bi, Zn, Cd, Hg, Cu, Sc, Y, La, the elements of lanthanide series, Ti, Zr, Hf, V, Nb, Ta, Cr, Mo, W, Mn, Re, Fe, Co, Ni or Pd in oxidation states of 1 or higher,

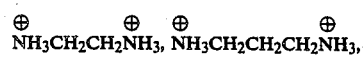

-continued

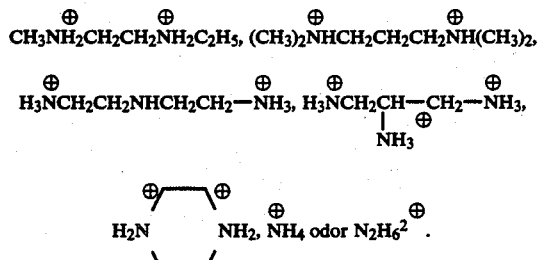

Regarding the term oxidation state, reference may be made to the Textbook of Inorganic Chemistry by A. F. Hollemann and E. Wiberg, Walter de Gruyter and Co. (1964, 57th to 70th edition), pages 166–177.
$Li^{\oplus}$, $Mg^{2\oplus}$, $Ca^{2\oplus}$, $Sr^{2\oplus}$, $Ba^{2\oplus}$, $Al^{3\oplus}$, $Sn^{2\oplus}$, $Zn^{2\oplus}$, $Sc^{3\oplus}$, $Co^{3\oplus}$, $Mn^{2\oplus}$,
$N^{\oplus}H_3$-$CH_2$-$CH_2$-$NH_3$ and $N^{\oplus}H_3$-$CH_2$-$CH_2$-$NH$-$CH_2$-$CH_2$-$N^{\oplus}H_3$,
in particular $Zn^{2\oplus}$, are advantageous.

The ionic polymers are advantageously produced by first preparing nonionic polymers consisting of a polymer main chain A, olefinically unsaturated side radicals B and, if desired, side radicals D, and reacting these nonionic polymers with compounds which donate the desired cations C.

To introduce the radicals B and, if desired, the radicals D into the alkadiene polymers A', i.e. the synthesis of the nonionic polymers, the alkadiene polymers A' are first reacted with maleic anhydride. This reaction, referred to as "maleation", is known per se and is described in detail in, for example, US-A-3,511,861 and by C. P. Pinazzi et al. in Bull. Soc. Chim. France, 2 (1961), 4323 et seq. It can be carried out in principle in two different ways. One route is thermal maleation, also referred to as an "ene reaction". The second route is free radical maleation in the presence of free radical initiators which promote graft copolymerization. Depending on the consistency of the alkadiene polymers A' (liquid or solid), the reaction can be carried out in the presence or absence of a solvent.

Thermal maleation of liquid alkadiene polymers A' is carried out in the absence of a solvent under nitrogen at about 190° C. Advantageously, gel inhibitors, such as hydroquinone, are added in small amounts. It has also proven advantageous to add small amounts of inert solvents in order to wash upwardly subliming maleic anhydride back into the reaction mixture.

The thermal maleation of solid alkadiene polymers A' is advantageously carried out in solution. If the reaction is to be carried out under atmospheric pressure and under nitrogen, a high boiling solvent, eg. decalin, tetralin, methyl isobutyl ketone or α-chloronaphthalene, is used. If a stirred autoclave and superatmospheric pressure are to be employed, a low boiling solvent, e.g. benzene, toluene or xylene, is used. The alkadiene polymer content of the solvent is in general from 5 to 40% by weight, and the amount of maleic anhydride is from 5 to 40% by weight based on A'. Advantageously, from 0.1 to 5% by weight, based on maleic anhydride and A', of a gel inhibitor are also added, and the reaction is carried out at from 190° to 230° C.

The free radical maleation is preferably carried out in solution. The alkadiene polymers A' are initially charged together with the maleic anhydride and brought to the reaction temperature under an inert gas atmosphere. The free radical initiator can be initially charged together with A' and maleic anhydride in one portion; however, it may be added all at once after the reaction temperature has been reached, or it may be metered in periodically a little at a time or continuously over the entire reaction time. Suitable free radical initiators are peroxides, hydroperoxides and azo compounds, e.g. di-tert.-butyl peroxide, benzoyl peroxide, tert.-butyl perbenzoate, dicumyl peroxide or azobisisobutyronitrile. Suitable reaction media are inert solvents boiling within a range of from 100° to 200° C. The reaction solution contains A' in a concentration of from 5 to 30% by weight. The reaction solution contains from 10 to 40% by weight of maleic anhydride and from 0.1 to 10% by weight of a free radical initiator, the percentages being based on the oligomer. The reaction is carried out at from 100° to 200° C.

The result of this reaction are maleated alkadiene polymers A' containing succinic acid anhydride side groups.

The maleated alkadiene polymers A' are then partially esterified or amidated directly in the solvent already present or after isolation by precipitation, partial esterification being preferred.

The result of this reaction is that the radicals B and, if used, the radicals D are introduced into the alkadiene polymers A', i.e. the nonionic polymers are formed.

During the second step the succinic anhydride side groups in the maleated alkadiene polymers A' are reacted with hydroxy or amino derivatives of compounds which contain olefinically unsaturated double bonds (precursor of the radicals B) or, if desired, additionally with compounds which contain polar groups (precursors of the radicals D).

Examples of compounds which are suitable for the formation of the radicals B are 2-hydroxyethyl acrylate, 2-hydroxyethyl methacrylate, 3-hydroxypropyl acrylate, 3-hydroxypropyl methacrylate, 4-hydroxybutyl acrylate, 4-hydroxybutyxl methacrylate, neopentyl methacrylate, neopentyl acrylate, pentaerythritol tiracrylate, 1,1,1-trimethylolpropane diacrylate, 1,1,1-trimethylolpropane dimethacrylate, glycidyl acrylate, glycidyl methacrylate, glycidyl diacrylate, glycidyl dimethacrylate, 2-aminoethylacrylamide, 2-aminoethylmethacrylamide, 2-hydroxyethylacrylamide, 2-hydroxyethylmethacrylamide, diethanolamine acrylate, diethanolamine methacrylate, diethylene glycol acrylate, diethylene glycol methacrylate, triethylene glycol acrylate, triethylene glycol methacrylate, tetraethylene glycol acrylate, tetraethylene glycol methacrylate, 4-hydroxy-n-butyl vinyl ether, 4-aminobutyl vinyl ether, 2-hydroxyethyl vinyl ether, 4-hydroxybut-1-ene or 4-aminobut-1-ene, of which 2-hydroxyethyl methacrylate, glycidyl methacrylate and 4-hydroxy-n-butyl vinyl ether are preferred.

Examples of compounds which are suitable for the formation of the radicals $R^5$ are glycerol, 1,2,6,7-tetrahydroxy-4-oxaheptane, ethylene glycol, ethanolamine, 2-thioloethanol, ethylenediamine, 2-hydroxyethanesulfonic acid, 2-hydroxyethanephosphonic acid, β-hydroxypropionic acid, poly(ethylene oxide) and ω-alkylpoly-(ethylene oxide).

If it is desired to introduce radicals D into the alkadiene polymer A', the amount of the compound which is suitable for forming the radicals B must be chosen so that one or more free succinic anhydride groups per molecule of a maleated alkadiene polymer A' are available for the reaction with the compounds suitable for forming the radicals D.

The esterification or amidation of maleated alkadiene polymers A' with hydroxy or amino compounds of the stated type is disclosed in JP-A-81/118 434, DE-A-27 33 274 and GB-A-2 048 941. To carry out this reaction, the maleated alkadiene polymer A' is used as initial charge in a concentration of from 10 to 80% by weight, based on the weight of the solution, in a suitable inert solvent, e.g. toluene, ethylbenzene, xylene or methyl isobutyl ketone. From 0.3 to 5% by weight of a tertiary amine, such as triethylamine, tri-n-butylamine, 1-methylpyrrole or p-dimethyl-aminopyridine, as a catalyst, from 0.3 to 5% by weight of a gel inhibitor, such as N-nitrosodiphenylamine, and the desired hydroxy or amino compounds are added at room temperature, the percentages in each case being based on maleated A'. The amounts and the type of hydroxy or amino compounds depend on the one hand on the number of succinic anhydride groups in the maleated alkadiene polymer A' and on the other hand on the desired ratios of radicals B to radicals D in the partially esterified or amidated products. The mixture is then stirred for several hours at from 50° to 90° C., and the reaction is monitored by continuously determining the intensity of the IR absorption band at 1,780 cm$^{-1}$, which is characteristic of the maleated alkadiene polymer A'. The partially esterified or amidated products are characterized by their acid number. This is understood as meaning the amount of 100% strength KOH, in mg, which is required for neutralizating the free acid functions present in 1 g of product.

The partially esterified or amidated products, i.e. the nonionic polymers, are then either reacted directly in the reaction mixture or after their isolation from the reaction mixture with suitable donors of cations C, thus yielding the ionic polymers consisting of the polymer main chain A, the side radicals B, the cations C and, if desired, the side radicals D.

During the second process for the partial esterification and amidation of maleated alkadiene polymers A', the succinic acid anhydride groups present therein are hydrolyzed with an equimolar amount of water with formation of succin-1-yl and -2-yl groups, and the hydrolyzed product is mixed with a glycidyl, oxirane, aziridine or thiirane compound at room temperature. It is advantageous to add sterically hindered phenolic antioxidants, eg. 2,6-di-tert.-butyl-p-cresol, in amounts of from 0.1 to 5% by weight, based on the maleated alkadiene polymer A'. The reaction is carried out at 60° C.

The amount and type of the glycidyl, oxirane aziridine or thiirane compound depends on the one hand on the number of succin-1-yl and -2-yl groups in the hydrolyzed maleated alkadiene polymer A', and on the other hand on the desired ratios of radicals B to radicals D in the partially esterified or amidated product. Examples of suitable glycidyl, oxirane, aziridine or thiirane compounds for the formation of the radicals B are glycidyl acrylate, glycidyl methacrylate, 1,2-dihydroxyprop-3-yl vinyl ether, 6,7-dihydroxy-4-oxahept-1-yl vinyl ether, 8,9-dihydroxy-6-oxanon-1-ene, oxirane-2-methylol methacrylate, aziridine-2-methylol methacrylate and thiirane-2-methylol methacrylate, of which glycidyl methacrylate is preferred.

Suitable compounds for the formation of the radicals D contain a glycidyl, oxirane, aziridine or thiirane radical and polar groups. Reactions of such compounds are disclosed in JP-A-80/087 465, JP-A-78/033 233 and JP-A-75/100 190.

In a preferred procedure, the cations C are introduced into the maleated and partially esterified or partially amidated alkadiene polymers A' (non ionic polymers) by reacting them with 1. inorganic metal compounds, such as oxides, hydroxides, alkoxides where alkyl is of 1 to 4 carbon atoms, or carbonates of Li, Mg, Ca, Sr, Ba, Al, Ga, In, Ge, Sn, Pb, Sb, Bi, Zn, Cd, Hg, Cu, Sc, Y, La, Ti, Zr, Hf, V, Nb, Ta, Cr, Mo, W, Mn, Re, Fe, Co, Ni, Pd or one of the lanthanides, or with 2. organic metal compounds having the structure (III)

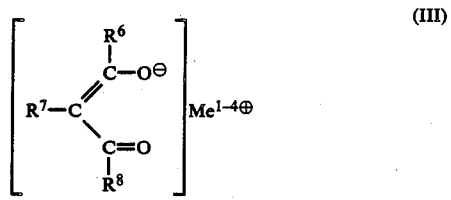

where Me is a cation of one of the above elements, and $R^6$, $R^7$ and $R^8$ are identical or different alkyl, cycloalkyl, aryl or alkylaryl groups, and the radicals $R^6$ and $R^8$ may be bonded to one another cyclically via ring systems and $R^6$ may furthermore be hydrogen, or with 3. ammonia, or with 4. polyfunctional amines, such as ethylenediamine, diethylenetriamine, N-methyl-N-ethylethylenediamine, N,N-dimethylethylenediamine, N,N'-diethylethylenediamine, N,N,N',N'-tetramethylethylenediamine, N,N,N'',N''-tetramethylethylenetriamine, 1,3-diaminopropane, 1,4-diaminobutane, pyrazine or polyvinylpyridine, or with 5. hydrazine.

The oxides, hydroxides, alkoxides, carbonates and acetylacetonates of Li$^\oplus$, Mg$^{2\oplus}$, Ca$^{2\oplus}$, Sr$^{2\oplus}$, Ba$^{2\oplus}$, Al$^{3\oplus}$, Su$^{2\oplus}$, Sb$^{3\oplus}$ and Zn$^{2\oplus}$ are preferred. The acetylacetonates, especially bis(acetylacetonato)Zn(II), are particularly preferred.

The cations C can be introduced into the maleated and partially esterified or amidated alkadiene polymers A' (nonionic polymers) in the melt or in solution. It is advantageous to carry out the reaction in a solvent which is capable of dissolving all relevant components to give a homogeneous solution, e.g. methylene chloride, chloroform, ethyl acetate, acetylacetone, ethyl acetylacetate, acetonitrile, propionitrile, acetone, methyl ethyl ketone, diethyl ether, tetrahydrofurane, dioxane, toluene, ethylbenzene or xylene. Toluene and tetrahydrofuran are preferred. The nonionic polymer is present in a concentration of from 10 to 80, preferably from 20 to 70, in particular from 25 to 60, % by weight, based on the weight of the solution. From 0.5 to 20, preferably from 1 to 15, in particular from 2 to 12, % by weight, based on the nonionic polymer, of the said compounds which donate cations C, in particular bis-(acetylacetonato)Zn(II), are added at room temperature, the reaction taking place spontaneously at this temperature. The resulting solution of the ionic polymers can be used directly for the preparation of photosensitive recording materials. However, it is also possible to isolate the ionic polymers by evaporating off the solvent.

In order to prepare the photopolymerizable or photocrosslinkable relief-forming layer (RL) of the novel photosensitive recording material, suitable photoinitiators are added to the ionic polymers. Such photoinitiators can be added alone or as a mixture with one another. Acyloins and their derivatives, such as benzoin, benzoin alkyl ethers, e.g. benzoin isopropyl ether, α-methylolbenzoin and its ether, e.g. α-methylolbenzoin methyl ether, α-methylbenzoin, α-methylbenzoin ethyl ether, vicinal diketones and their derivatives, e.g. benzil, benzil acetals, such as benzil dimethyl acetal, benzil methyl ethyl acetal, benzil methyl benzyl acetal or benzil ethylene glycol acetal and in particular acylphosphine oxide compounds of the type described, for eample in DE-A-29 09 992 and DE-A-31 14 341, for use in photopolymerizable mixtures are advantageous. Preferred initiators from the acylphosphine oxide class are 2,6-dimethoxybenzoyldiphenylphosphine oxide, 2,4,6-trimethylbenzoyldiphenylphosphine oxide, ethyl 2,4,6-trimethylbenzoylphenylphosphinate and sodium 2,4,6-trimethylbenzoylphenylphosphinate. The photopolymerization initiators and/or activators may also be used in conjunction with other coinitiators and/or activators, as described in the relevant literature. Photoreactive initiators which initiate a cationic polymerization, eg. pyrrylium hexafluoroarsenate, as described in EP-A-74073, are also suitable. The photoinitiators are advantageously used in an amount of from 0.001 to 10 parts by weight per 100 parts by weight of the ionic polymer, the amount also being dependent on the presence of photopolymerizable monomers.

It is often advantageous if further non-photopolymerizable assistants and/or additives, for example thermal polymerization inhibitors, dyes, pigments, plasticizers, agents for improving the relief structure, crosslinking agents, antioxidants, antiozonants, fillers, fluxes, antihalation agents and/or mold release agents, are added to the ionic polymers.

Furthermore, photopolymerizable, nongaseous monomers may be added to the ionic polymers. These monomers should be compatible with the ionic polymers. The term "compatible" is understood as meaning the ability of two or more components to remain dispersed, one in the other, without producing any substantial scattering of actinic radiation. Moreover, they should be soluble or at least dispersible in the liquid basic media used for developing the novel photosensitive recording materials.

Suitable monomers are esters or amides of acrylic or methacrylic acid. ω-methylpoly(ethylene oxide)-α-yl acrylate, reaction products of glycerol, epichlorohydrin and acrylid acid in a molar ratio of, for example, 1:3:3, tripropylene glycol diacrylate or trimethylolpropane triacrylate are advantageous. They may be used in an amount of up to 30 parts by weight per 100 parts by weight of ionic polymer.

All components should be matched up with one another so that, after imagewise exposure, the novel photosensitive recording materials can be washed out, i.e. developed, with liquid basic media.

Suitable media of this type are organic amines, such as triethylamine, diethylamine, di-n-butylamine, methyldi-n-butylamine, ethylenediamine, triethylenediamine, ethanolamine, diethanolamine, triethanolamine, pyridine, pyrrole or pyrazine, mixtures of such amines and of ammonia with solvents such as $H_2O$, methanol, ethanol, propanol, butanol, diethyl ether, di-n-butyl ether, acetone, methyl ethyl ketone, tetrahydrofurane or dioxane, solvents such as N-methylpyrrolidone, dimethyl sulfoxide and hexamethylphosphoric acid triamide, and mixtures of these with solvents of the above type, and aqueous solutions of inorganic bases, such as LiOH, NaOH or KOH or alcoholic solutions of alkoxides such as $LiOCH_3$ or $NaOC_2H_5$, and aqueous solutions of strongly basic salts, e.g. $Na_2CO_3$, $K_2CO_3$ or $Na(OOCCH_3)$. Solutions of ammonia, NaOH or $Na_2CO_3$ in water are preferred.

Conventional techniques, such as mixing in solvents, ball milling and extruding, can be used for mixing the ionic polymers with the photoinitiators and, if desired, the further additives.

The resulting photosensitive mixture can be converted into the photopolymerizable or photocrosslinkable relief-forming layer (RL) of the novel photosensitive recording material by conventional techniques such as pressing, extruding, calendering or solvent casting.

The thickness of the photopolymerizable or photocrosslinkable relief-forming layer (RL) can vary within wide limits, depending on the intended use of the multilayer elements, and is in general from 0.1 to 6,000 μm. For the production of printing plates, relief plates and photoresists, layer thicknesses of from 1 to 6,000 μm, in particular from 1.5 to 2,000 μm, are preferred.

The photopolymerizable or photocrosslinkable relief-forming layer (RL) is applied directly onto the dimensionally stable support layer or, depending on the materials used, are bonded to the support layer by means of an adhesive layer, which is generally about 0.5–40 μm thick, thus yielding the novel photosensitive recording materials in the shape of a multilayer element. Suitable adhesive layers are the adhesives and mixtures of adhesive-forming components which are conventionally used for this purpose, for example polyurethane-based 1-component or 2-component adhesives, or adhesive layers as described in DE-A-30 15 419.

Suitable support layers for the multilayer elements include, in particular, dimensionally stable plastic films, e.g. polyester films, and metallic sheets, e.g. steel sheets, iron sheets, nickel sheets, aluminum sheets or conical or sperical nickel sleeves. Elastomeric films and foams are also suitable as support layers. For the production of photoresist layers, it is also possible to use copper, copper-plated materials, printed circuits, etc. as support layers for the relief-forming layer (RL). The support layer, in particular the metallic sheets, can be pretreated mechanically, chemically or electrochemically and/or can be provided with an adhesion promoter. In order to achieve adequate adhesion between the support layer and the relief-forming layer (RL), it is possible, particularly in the case of multilayer elements for the production of printing plates and relief plates, to arrange more than one adhesive layer between the support layer and the said layer (RL). The choice of the support layer material depends mainly on the intended use of the multilayer elements.

The free surface of the relief-forming layer (RL) of the novel photosensitive recording material can be covered by a cover sheet of a thickness from about 10 to 150 μm. The cover sheet may be matt. The free surface of the relief-forming layer (RL) can also be covered by a protective layer of a thickness from about 0.5 to about 20 μm consisting of, for example, highly hydrolyzed polyvinyl acetate, and acting as an oxygen barrier. The protective layer may be matt. Furthermore, the free surface of the relief-forming layer (RL) can be covered with the said protective layer, and the free surface of the said protective layer can in turn be covered with the said cover sheet.

The multilayer elements are produced in a conventional manner by preparing the individual layers and bonding them together and then adhering the assembly to the support layer. For example, the photopolymerizable or photocrosslinkable relief-forming layer (RL) can be prepared by the aforementioned conventional methods and can then be adhered to the support layer in a suitable manner, for example by lamination, pressing or calendering. Advantageously, the components of the said layer (RL) are dissolved in a solvent, preferably toluene and/or tetrahydrofurane, and the said layer (RL) is prepared by casting this solution on the support layer. Those components of the said layer (RL) which are not readily soluble in toluene or tetrahydrofurane are, if required, dissolved beforehand in toluene-miscible or tetrahydrofurane-miscible organic solvents, such as lower alcohols, lower ketones, etc., and then combined with the toluene or tetrahydrofurane casting solution. After the relief-forming layer (RL) has been cast onto the support layer, the solvent is removed in a conventional manner and the relief-forming layer (RL) is dried.

The multilayer elements are suitable, for example, for the production of printing plates, relief plates or photoresists. To do this, the photopolymerizable or photocrosslinkable relief-forming layer (RL) of the multilayer element is exposed imagewise to actinic light in a conventional manner and developed by washing out the unexposed, non-photopolymerized or non-photocrosslinked areas of the layer (RL) with a liquid basic medium (developer), thus yielding a relief-layer (RL').

Suitable light sources for effecting the exposure, which may be carried out in a flat-plate exposure unit or a rotary exposure unit, are the conventional sources of actinic light, for example UV fluroescent tubes, high pressure, medium pressure or low pressure mercury lamps, superactinic fluorescent tubes, pulsed xenon lamps, metals halide-doped lamps, carbon arc lamps or sunlight. The wavelength emitted should in general be from 230 to 450 nm, preferably, from 300 to 420 nm, and should be matched to the inherent absorption of the photoinitiator used.

The imagewise exposed relief-forming layer (RL) can be developed by washing, brushing, etc. with the developer. Because the exposed areas of the relief-forming layer (RL) is highly water resistant, the multilayer elements have the advantage that, for development with water, the washout conditions can be made more severe without the resulting relief layer (RL') being adversely affected. On the contrary, this gives sharper relief images. After the washout procedure, the resulting printing plates, relief plates and photoresists are dried in a conventional manner at temperatures up to 120° C. In some cases, it is advantageous if the resulting printing plates, relief plates and photoresists are then subjected to uniform post-exposure to actinic light in order to increase the mechanical strength of their relief layer (RL').

EXAMPLES

The Examples which follow illustrate the invention. In the Examples and comparative experiments, parts and percentages are by weight, unless stated otherwise. Parts by volume bear the same relation to parts by weight as that of the liter to the kilogram. The hydrolysis number is the amount of 100% strength KOH, in mg, which is required to neutralize the free acid groups formed in 1 g of substance by hydrolysis.

Preparation of the nonionic polymers

Reference Examples 1 to 4

For the Examples and the comparative experiments, various nonionic polymers were prepared. The first step in this procedure is the maleation of butadiene oligomers having a number average molecular weight $M_n$ of from 500 to 10,000.

Reference Example 1

Maleation of oligobutadiene, $M_n = 1,300$; microstructure: 45% of vinyl double bond and 40% of 1,4-trans and 15% of 1,4-cis double bonds.

2,500 g of oligobutadiene, 500 g of maleic anhydride, 100 g of xylene and 25 g of hydroquinone (gel inhibitor) were initially charged into a 4 l three-necked flask equipped with a mechanical stirrer, a reflux condenser, a thermometer and a line for flushing with $N_2$. The reaction flask was flushed with nitrogen for 5 minutes. The contents of the reaction flask were heated to 190° C. under an $N_2$ atmosphere and, with constant stirring, were kept at this temperature for 6 hours. At the end of this period the xylene was stripped off under reduced pressure. To determine the conversion, a small sample was precipitated in ethanol and, after reprecipitation twice from toluene with ethanol, the hydrolysis number was determined. The conversion (based on maleic anhydride used) was more than 90%. Accordingly, the reaction product was a maleated oligobutadiene having a degree of maleation of 15%.

Reference Example 2 to 4

A maleated oligobutadiene ($M_n$ of the starting material = 5,000; microstructure: 17% of vinyl double bonds and 55% of 1,4-trans and 30% of 1,4-cis double bonds) having a degree of maleation of 20% and serving as Reference Example 2, was prepared in the same manner.

A maleated oligobutadiene (starting material as for Reference Example 2) having a degree of maleation of 10% and serving as Reference Example 3, was prepared in the same manner.

A maleated oligobutadiene (starting material as for Reference Example 1) having a degree of maleation of 5% and serving as Reference Example 4, was prepared in the same manner.

Reference Examples 5 to 9

The maleated oligobutadienes of Reference Examples 1 to 4 were partially esterified. Two methods were employed:

Method I:
Reaction of the maleated oligobutadienes with hydroxyl-containing compounds (Reference Examples 5 to 8)

Method II:
Hydrolysis of the maleated oligobutadienes and reaction with glycidyl-containing compounds (Reference Example 9).

The products of the reactions are the nonionic polymers.

Reference Example 5

654 g of maleated oligobutadiene according to Reference Example 1, 1,000 ml of toluene (dried over a molecular sieve), 3 g of dimethylaminopyridine, 3 g of N-nitrosodiphenylamine and 196 g of 2-hydroxyethyl methacrylate were mixed at room temperature in a 2 l three-necked flask equipped with a stirrer, a reflux condenser, a thermometer and a dropping funnel. The reaction mixture was stirred for from 3 to 5 hours at from 50° to 90° C. At the end of this period, the IR absorption band at 1,780 cm$^{-1}$, which is characteristic of the maleic anhydride/oligobutadiene adduct, had vanished. Excess 2-hydroxyethyl methacrylate was distilled off together with the solvent under reduced pressure, and the product was characterized by its acid number and the increase in weight. The acid number showed that more than 95% of the succinic anhydride groups originally present had been converted. The increase in weight was 19.8%, based on the maleated oligobutadiene of Reference Example 1.

Reference Example 6

A nonionic polymer serving as Reference Example 6, was prepared in the same manner from the maleated oligobutadiene according to Reference Example 2, in which more than 95% of the succinic anhydride groups originally present had been converted.

Reference Example 7

A nonionic polymer serving as Reference Example 7, was prepared in the same manner from the maleated oligobutadiene according to Reference Example 3, in which more than 95% of the succinic anhydride groups originally present had been converted.

Reference Example 8

500 g of maleated oligobutadiene according to Reference Example 4, 29 g of 4-hydroxybutyl vinyl ether, 20 g of pyridine, 0.3 g of dimethylaminopyridine and 0.3 g of N-nitrosodiphenylamine were initially charged at room temperature into a 2 l three-necked flask equipped with a mechanical stirrer, a reflux condenser and a thermometer. The reaction mixture was stirred for from 3 to 5 hours at from 50° to 70° C. At the end of this period, the IR absorption band at 1,780 cm$^{-1}$, which is characteristic of the maleated oligobutadiene, had vanished. The product was dried under reduced pressure and characterized by its acid number and the increase in weight. The acid number showed that more than 90% of the succinic anhydride groups originally present had been converted. The increase in weight was 5.8%, based on the maleated oligobutadiene of Reference Example 4.

Reference Example 9

300 g of maleated oligobutadiene according to Reference Example 2, having a degree of maleation of 20%, was hydrolyzed with an equivalent amount of water and the product was mixed with 64 g of glycidyl methacrylate and 2 g of 2,6-di-tert.-butyl-p-cresol at room temperature and stirred for 5 hours at 60° C. At the end of this period the excess reactants were removed under reduced pressure. The product was then characterized by IR spectroscopy and by means of the acid number. The latter showed that about 66% of the anhydride groups originally present had been esterified.

Preparation and use of the ionic polymers according to the invention

The nonionic polymers of Reference Example 5 to 9 were reacted with bis(acetylacetonato)Zn(II) to give the ionic polymers.

The ball indentation hardness was determined on the basis of DIN 50,351, as a ratio of test load to surface area of the indentation under the test load (p/mm$^2$), and the deformation ($\mu$m/$\mu$m layer thickness) was determined using an applied pressure of 100 kp/0.64 cm.

Examples 1 to 3 and Comparative Experiment 1

Effect of cation concentration on mechanical and optical properties of the nonionic polymers.

Toluene solutions consisting of (a) a nonionic polymer according to Reference Example 9, (b) benzil dimethyl acetal and (c) bis(acetylacetonato)Zn(II) were cast to give 3,500 $\mu$m thick specimens (dry thickness). The state of the specimens was checked visually and manually. Table 1 shows the composition of the specimens and the test results.

Comparative Experiment 1 was carried out in a similar manner, except that the addition of bis(acetylacetonato)Zn(II) was dispensed with. The test results are likewise shown in Table 1.

TABLE 1

Effect of cation concentration on mechanical and optical properties of the nonionic polymer according to Reference Example 9

| Example No. | % of polymer according to Reference Example 9 | % of bis(acetyl-acetonato)Zn(II) | Resulting ionic polymer % A | % B | % C | % of benzil dimethyl acetal | State of specimen |
|---|---|---|---|---|---|---|---|
| 1 | 94 | 3 | 59.55 | 39.72 | 0.73 | 3 | solid, tacky, transparent |
| 2 | 91 | 6 | 59.12 | 39.41 | 1.47 | 3 | solid, tacky, transparent |
| 3 | 87 | 10 | 58.55 | 39.03 | 2.42 | 3 | solid, nontacky, transparent |
| Comparative Experiment 1 | 97 | 0 | — | | | 3 | Liquid, highly viscous, transparent |

Examples 4 to 6 and Comparative Experiment 2

Exaples 1 to 3 were repeated, except that the nonionic polymer according to Reference Example 6 was used instead of the polymer according to Reference Example 9. Table 2 shows the composition of the specimens and the test results.

Comparative Experiment 2 was carried out in a similar manner, except that the addition of bis- (acetylacetonato)Zn(II) was dispensed with. The test results are likewise shown in Table 2.

tained which exhibited high resolution and faithfully reproduced even the finest details of the original.

TABLE 2

Effect of cation concentration on mechanical and optical properties of the nonionic polymer according to Reference Example 6

| Example No. | % of polymer according to Reference Example 6 | % of bis(acetyl-acetonato)Zn(II) | Resulting ionic polymer % A | % B | % C | % of benzil dimethyl acetal | State of specimen |
|---|---|---|---|---|---|---|---|
| 4 | 94 | 3 | 59.55 | 39.72 | 0.73 | 3 | Liquid, highly viscous |
| 5 | 91 | 6 | 59.12 | 39.41 | 1.47 | 3 | solid, transparent, slightly tacky |
| 6 | 87 | 10 | 58.55 | 39.03 | 2.42 | 3 | solid, transparent, non-tacky |
| Comparative Experiment 2 | 97 | 0 | — | | | 3 | Liquid, transparent |

Example 7 and Use Example 1

88.5% of the nonionic polymer according to Reference Example 6, 5% of bis(acetylacetonato)Zn(II) and 3% of benzil dimethyl acetal were dissolved in toluene (solids content 33%). During this procedure, the nonionic polymer reacted with the acetylacetonate with formation of the ionic polymer, which consisted of 59.26% of A, 39.52% of B and 1.22% of C. The solution was cast onto a 125 μm thick polyester film (support layer) provided with a polyurethane coating, the resulting relief-forming layer (RL) being 380 μm thick after drying. The relief-forming layer (RL) was exposed through a photographic negative in a flat-plate exposure unit for 6 minutes. The unexposed material of the layer (RL) was washed out with aqueous sodium hydroxide solution in a brush washer. The printing plate thus obtained possessed high resolution, showed no shrinkage due to photopolymerization and had excellent planarity. The printing plate had a ball indentation hardness of 998±10 p/mm$^2$. After treatment with water at 25° C. for 24 hours, it showed a swelling of −0.3% and an extraction loss of 2%. The printing plate had excellent printing properties, faithfully reproduced the original and exhibited good flexibility.

Example 8 and Use Example 2

80% of the nonionic polymer according to Reference Example 5, 10% of tripropylene glycol diacrylate, 3% of benzil dimethyl acetal and 7% of bis(acetylacetonato)Zn(II) were dissolved in toluene (solids content 40%). During this procedure, the nonionic polymer reacted with the acetylacetonate with formation of the ionic polymer, which consisted of 68.81% of A, 29.49% of B and 1.70% of C. The solution was cast, as described in Example 7, onto a 125 μm thick polyester film (support layer). After removal of the solvent, the relief-forming layer (RL) thus obtained was covered with a 10 μm thick polyethylene film (cover sheet) and then exposed through a photographic negative for 10 minutes in a flat-plate exposure unit. After the imagewise exposure, the polyethylene film (cover sheet) was removed, together with the unexposed areas of the relief-forming layer (RL). The remaining exposed areas were washed out with aqueous NaOH solution. A non-tacky printing plate was ob-

Example 9 and Use Example 3

81.5% of the nonionic polymer according to Reference Example 7, 10% of tripropylene glycol diacrylate, 3% of benzil dimethyl acetal and 5.5% of bis(acetylacetonato)Zn(II) were combined to form a casting solution, as stated in Example 8. During this procedure, the nonionic polymer reacted with the acetylacetonate with formation of the ionic polymer consisting of 78.93% of A, 19.73% of B and 1.34% of C. The casting solution was then processed as described in Example 8. The resulting relief-forming layer (RL) was covered with a polyethylene film (cover sheet) and then exposed through a negative. After removal of the cover sheet, the unexposed areas were washed out with aqueous ammoniacal solution (pH 10). The printing plate thus obtained was non-tacky, showed high resolution and possessed a deformation of 36 μm/1,000 μm under an applied pressure of 100 kp/0.64 cm$^2$.

Comparative Experiment 3

The procedure described in Example 9 was followed, except that in this case no bis(acetylacetonato)Zn(II) was added. The unexposed relief-forming layer (RL) was liquid and highly viscous and showed pronounced cold flow. The liquid relief-forming layer (RL) was covered with a 10 μm thick polyethylene film and then exposed through a negative, followed by development of the exposed relief-forming layer (RL), to give a printing having a non-tacky surface, high resolution and good washout properties in aqueous ammonia. The relief layer (RL') possessed a deformation of 138 μm/1,000 μm layer thickness under an applied pressure of 100 kp/0.64 cm$^2$ however, it was prone to swelling.

Example 10 and Use Example 4

Using tetrahydrofurane as a solvent, a solution having the following composition was prepared: 87% of the nonionic polymer according to Reference Example 7, 10% of bis(acetylacetonato)Zn(II) and 3% by weight of benzil dimethyl acetal (solids content 30%). During this procedure, the nonionic polymer reacted with the acetylacetonate with formation of the ionic polymer consisting of 58.55% of A, 39.03% of B and 2.42% of C. After filtration through a 1.5 μm filter, the solution was applied uniformly onto a 60 μm thick polyethylene terephthalate film (cover sheet) with the aid of a knife coater or a doctor blade so that, after drying, a 25 μm thick non-tacky relief-forming layer (RL) resulted. The multilayer element thus prepared was laminated with a copper-plated substrate as used for the production of printed circuit boards (support layer), lamination being carried out at 120° C. and at a rate of 1 m/min. The photoresist layer (RL) thus obtained was exposed imagewise through a photographic negative for 10 seconds using a 5,000 W flat-plate exposure unit, and the polyethylene terephthalate film was then peeled off. The unexposed areas of the exposed photoresist layer (RL) were washed out with 0.5% strength aqueous sodium hydroxide solution. The resulting photoresist had sharp edges and faithfully reproduced of the original. The photoresist was very stable in commercial etching baths and electroplating baths.

Example 11 and Use Example 5

The process described in Example 10 was used for the preparation of the photoresist layer (RL). The following composition was employed: 91.3% of the nonionic polymer according to Reference Example 7, 5.4% of bis(acetylacetonato)Zn(II) and 3% of benzil dimethyl acetal. The solids content of the solution was 30%. During dissolving the said component the nonionic polymer reacted with the acetylacetonate with formation of the ionic polymer consisting of 59.21% of A, 39.47% of B and 1.32% of C. A photoresist was produced using the procedure stated in Example 10. The exposure time was 14 seconds. The reproduction of the original and the stability to etching baths and electroplating baths were excellent.

Example 12 and Use Example 6

80% of the nonionic polymer according to Reference Example 8, 10% of tripropylene glycol diacrylate, 3% of benzil dimethyl acetal and 7% of bis-(acetylacetonato)Zn(II) were dissolved in toluene, as described in Example 8. During this procedure, the nonionic polymer reacted with the acetylacetonate with formation of the ionic polymer consisting of 88.47% of A, 9.83% of B and 1.70% of C. The resulting casting solution was used to prepare a multilayer element. The latter was exposed through a negative for 6 minutes and washed out for 10 minutes with aqueous ammonia (pH 10). The printing plate thus obtained possessed high resolution and excellent resilience and flexibility.

Example 13 and Use Example 7

A solution of 74 parts of the nonionic polymer according to Reference Example 5, 6 parts of bis-(acetylacetonato)Zn(II), 10 parts of trimethylolpropane triacrylate, 6 parts of benzophenone, 2 parts of Michlers ketone and 1 part of Victoria blue (C.I. 44.045) in 200 parts of toluene and 700 parts of tetrahydrofurane (the said solution containing the ionic polymer consisting of 68.97% of A, 29.56% of B and 1.47% of C, formed by the reaction of the nonionic polymer with the acetylacetonate) was applied to an electrochemically roughened and non-doped aluminum sheet serving as support layer for an offset printing plate. After the solvent had been evaporated, the resulting relief-forming layer (RL) was dried for 2 minutes at 80° C., yielding a dry layer (RL) of a thickness of 1.6 μm. The dry relief-forming layer (RL) was covered with a 4.5 μm thick protective layer of polyvinyl alcohol prepared by hydrolyzing polyvinyl acetate (degree of hydrolysis: 98 mol %). The multilayer element prepared in this manner was exposed imagewise to actinic light for 10 seconds in an exposure unit being typical for exposing offset printing plates and employing a 3 kW lamp. The imagewise exposed multilayer element was washed out with an aqueous alkaline solution of pH 11.3. The resulting offset printing plate withstood a print run of 25,000 without suffering the slightest damage even to the very fine image sections (2% tonal value, 60 lines/cm).

Example 14 and Use Example 8

The procedure followed was essentially the same as that described in Example 13, except that the 10 parts of tripropylene glycol diacrylate were replaced by 10 parts of solvent. The resulting offset printing plate had the same good properties as that described in Example 13. The only difference was that the exposure time required was somewhat longer than that given in Example 13.

We claim:

1. A photosensitive recording element for the preparation of photopolymerized printing plates, relief plates or photoresists comprising
(i) a dimensionally stable, solid, non-tacky, elastomeric photopolymerizable or photocrosslinkable layer (RL) of a thickness from 0.1 to 6000 μm developable in the aqueous basic media and consisting essentially of
(ii) an ionic polymer which contains
(A) from about 45 to about 90% by weight, based on the ionic polymer, of a polymer main chain formed from an alkadiene polymer A′ having a number average molecular weight $M_n$ of from 500 to 20,000,
(B) from about 6 to about 45% by weight, based on the ionic polymer, of one or more olefinically unsaturated side radicals which are introduced into the alkadiene polymer A′ by, first, maleation of the alkadiene polymer A′ yielding succinic acid anhydride side groups therein, and, second, partial esterification or partial amidation of the said succinic acid anhydride side groups with suitable compounds, said side radicals B having the structure (I),

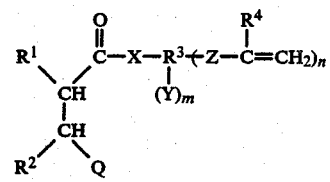

where $R^1$ and $R^2$ differ from one another and are each hydrogen or a carbon atom of the alkadiene chain A′, $R^3$ is selected from the group consisting of polyvalent, straight-chain aliphatic hydrocarbon radicals of 1 to 20 carbon atoms, polyvalent, branched aliphatic hydrocarbon radicals of 1 to 20 carbon atoms, polyvalent, straight-chain aliphatic hydrocarbons radicals of 1 to 20 carbon atoms whose chains are interrupted by oxygen, nitrogen or sulfur, and polyvalent, branched aliphatic hydrocarbon radicals of 1 to 20 carbon atoms whose chains or branches are interrupted by oxygen, nitrogen or sulfur; X is oxygen, sulfur or amino, Y is a polar group, m is 0 or an integer from 1 to 5, n is an integer from 1 to 3, Z is a methylene, ether, amide or ester group, $R^4$ is hydrogen or methyl, and Q is carboxyl or carboxylate, and (C) from about 0.5 to about 10% by weight, based on the ionic polymer, of cations selected from the group consisting of cations of elements of the main groups I to V, of the subgroups I to VIII and of the Lanthanide series of the periodic table of elements, of ammonia, of polyfunctional organic amines, and of hydrozine, (i2) from 0.001 to 10 parts by weight per 100 parts by weight of the ionic polymer of one or more photoinitiators, and (i3) from 0 to 30 parts by weight per 100 parts by weight of the ionic polymer of photopolymerizable, nongaseous monomers which are compatible with the ionic polymer, and (ii) a dimensionally stable support layer.

2. A photosensitive recording element for the preparation of photopolymerized printing plates, relief plates or photoresists comprising (i) a dimensionally stable, elastomeric photopolymerizable or photocrosslinkable layer (RL) of a thickness from 0.1 to 6000 μm developable in the aqueous basic media and consisting essentially of (i1) an ionic polymer which contains (A) from about 45 to about 90% by weight, based on the ionic polymer, of a polymer main chain formed from an alkadiene polymer A' having a number average molecular weight $M_n$ of from 500 to 20,000, (B) from about 6 to about 45% by weight, based on the ionic polymer, of one or more olefinically unsaturated side radicals which are introduced into the alkadiene polymer A' by, first, maleation of the alkadiene polymer A' yielding succinic acid anhydride side groups therein, and, second, partial esterification or partial amidation of the said succinic acid anhydride side groups with suitable compounds, said side radicals B having the structure (I),

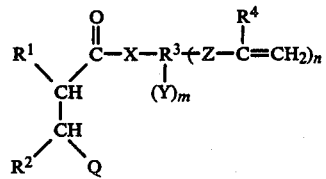

where $R^1$ and $R^2$ differ from one another and are each hydrogen or a carbon atom of the alkadiene chain A', $R^3$ is selected from the group consisting of polyvalent, straight-chain aliphatic hydrocarbon radicals of 1 to 20 carbon atoms, polyvalent, branched aliphatic hydrocarbon radicals of 1 to 20 carbon atoms, polyvalent, straight-chain aliphatic hydrocarbons radicals of 1 to 20 carbon atoms whose chains are interrupted by oxygen, nitrogen or sulfur, and polyvalent, branched aliphatic hydrocarbon radicals of 1 to 20 carbon atoms whose chains or branches are interrupted by oxygen, nitrogen or sulfur; X is oxygen, sulfur or amino, Y is a polar group, m is 0 or an integer from 1 to 5, n is an integer from 1 to 3, Z is a methylene, ether, amide or ester group, $R^4$ is hydrogen or methyl, and Q is carboxyl or carboxylate, and (C) from about 0.5 to about 10% by weight, based on the ionic polymer, of cations selected from the group consisting of cations of elements of the main groups I to V, of the subgroups I to VIII and of the Lanthanide series of the periodic table of elements, of ammonia, of polyfunctional organic amines, and of hydrazine, (i2) from 0.001 to 10 parts by weight per 100 parts by weight of the ionic polymer of one or more photoinitiators, and (i3) from 0 to 30 parts by weight per 100 parts by weight of the ionic polymer of photopolymerizable, nongaseous monomers which are compatible with the ionic polymer, and (ii) a dimensionally stable support layer.

3. A photosensitive recording element as set forth in claim 1, wherein the cations of component (C) are $Zn^{2\oplus}$.

4. A photosensitive recording element as set forth in claim 2, wherein the cations of component (C) are $Zn^{2\oplus}$.

* * * * *